US009361111B2

(12) United States Patent
Scalabrino et al.

(10) Patent No.: US 9,361,111 B2
(45) Date of Patent: Jun. 7, 2016

(54) TRACKING SPECULATIVE EXECUTION OF INSTRUCTIONS FOR A REGISTER RENAMING DATA STORE

(71) Applicant: ARM LIMITED, Cambridge (GB)

(72) Inventors: Luca Scalabrino, Sophia Antipolis (FR); Melanie Emanuelle Lucie Teyssier, Sophia Antipolis (FR); Cedric Denis Robert Airaud, Sophia Antipolis (FR); Guillaume Schon, Sophia Antipolis (FR)

(73) Assignee: ARM Limited, Cambridge (GB)

( * ) Notice: Subject to any disclaimer, the term of this patent is extended or adjusted under 35 U.S.C. 154(b) by 735 days.

(21) Appl. No.: 13/737,153

(22) Filed: Jan. 9, 2013

(65) Prior Publication Data

US 2014/0195787 A1    Jul. 10, 2014

(51) Int. Cl.
*G06F 9/30* (2006.01)
*G06F 9/38* (2006.01)

(52) U.S. Cl.
CPC .............. *G06F 9/3842* (2013.01); *G06F 9/384* (2013.01); *G06F 9/3836* (2013.01); *G06F 9/3885* (2013.01)

(58) Field of Classification Search
CPC ..... G06F 9/3836; G06F 9/384; G06F 9/3838; G06F 9/3824; G06F 9/3885; G06F 9/30
See application file for complete search history.

(56) References Cited

U.S. PATENT DOCUMENTS 6,675,372 B1 *  1/2004  Damron ................ G06F 9/3842
                                                    712/E9.05
7,702,887 B1 *  4/2010  Grohoski ............ G06F 11/3466
                                                    712/227

OTHER PUBLICATIONS

J. Alastruey et al., "Microarchitectural support for speculative register renaming", *Parallel and Distributed Processing Symposium*, 2007, IPDPS 2007. IEEE International, 10 pages.
S. Petit et al., "An Efficient Low-Complexity Alternative to the ROB for Out-of-Order Retirement of Instructions", *Digital System Design, Architectures, Methods and Tools*, 2009. DSD" 09, pp. 636-642.
J.F. Martinez et al., "Cherry: checkpointed early resource recycling in out-of-order microprocessors", *Microarchitecture*, 2002, 12 pgs.
W-Y. Chen et al., "Re-Order Buffer for Superscalar SMIPSv2 Processor", [online] 2007, http://csg.csail.mitedu/6.375/6_375_2007_www/projects/group4_final_report.pdf, 35 pgs.
D.M. Koppelman, "The Impact of Fetch Rate and Reorder Buffer Size on Speculative Pre-Execution", *Architecture*, 2003, pp. 1-11.
M. Rosiere et al., "An out-of-order superscalar processor on FPGA: The ReOrder Buffer design", *Design, Automation & Test in Europe Conference & Exhibition (DATE)*, 2012, pp. 1549-1554.

(Continued)

*Primary Examiner* — Farley Abad
(74) *Attorney, Agent, or Firm* — Nixon & Vanderhye P.C.

(57) ABSTRACT

First processing circuitry processes at least part of a stream of program instructions. The first processing circuitry has registers for storing data and register renaming circuitry for mapping architectural register specifiers to physical register specifiers. A renaming data store stores renaming entries for identifying a register mapping between the architectural and physical register specifiers. At least some renaming entries have a count value indicating a number of speculation points occurring between generation of a previous count value and generation of the count value. The speculation points may for example be branch operation or load/store operations.

24 Claims, 9 Drawing Sheets

(56) References Cited

OTHER PUBLICATIONS

V. Kontorinis et al., "Reducing peak power with a table-driven adaptive processor core", *Proceedings of the 42$^{nd}$ Annual IEEE/ACM International Symposium on Microarchitecture. ACM*, 2009, 12 pgs.

J.L. Aragon et al., "Power-aware control speculation through selective throttling" *High-Performance Computer Architecture*, 2003, 10 pgs.

* cited by examiner

| | Arch | Ren | Rec | Spec? |
|---|---|---|---|---|
| C0 | R0 | R17 | - | 0 |
| BR0 | (Rx) | (Ry) | - | 1 |
| C1 | R7 | R8 | R31 | 0 |
| BR1 | (Rx) | (Ry) | - | 1 |
| BR2 | (Rx) | (Ry) | - | 1 |
| C4 | R18 | R11 | R1 | 0 |
| BR3 | (Rx) | (Ry) | - | 1 |
| BR4 | (Rx) | (Ry) | - | 1 |
| C5 | R9 | R2 | R9 | 0 |

|  | Arch | Rename | Recover | Spec? |
|---|---|---|---|---|
| BR0 | (Rx) | (Ry) | - | 1 |
| BR1 | (Rx) | (Ry) | - | 1 |
| D2 | R3 | R24 | R9 | 0 |
| D3 | R3 | R7 | R21 | 0 |
| BR2 | (Rx) | (Ry) | - | 1 |
| BR3 | (Rx) | (Ry) | - | 1 |
| D5 | R11 | R12 | R4 | 0 |
| BR4 | (Rx) | (Ry) | - | 1 |

FIG. 4

|  | Arch | Ren | Rec | Δ |
|---|---|---|---|---|
| D2 | R3 | R24 | R9 | 2 |
| D3 | R3 | R7 | R21 | 0 |
| D5 | R11 | R12 | R4 | 2 |
|  |  | ⋮ |  |  |

FIG. 5

TRACKING SPECULATIVE EXECUTION OF INSTRUCTIONS FOR A REGISTER RENAMING DATA STORE

BACKGROUND

The present invention relates to the field of data processing. In particular, the invention relates to a technique for tracking speculative execution of instructions for a register renaming data store in a data processing apparatus.

A program instruction may identify a register storing a data value to be processed. Register renaming is a technique used to map an architectural register specifier identified by a program instruction to a physical register specifier identifying a physical register of the processing apparatus. Register renaming can improve processing performance by removing some of the data dependency restrictions which constrain scheduling of instruction execution. For example, two instructions which identify the same architectural register specifier can have their architectural register specifiers mapped to different physical register specifiers to eliminate the data dependency hazard, allowing the instructions to be executed in parallel or out-of-order.

Sometimes while executing a program, a point of execution (referred to herein as a "speculation point" or "speculation node") may be reached after which there are several possible instructions which could be executed. Which instruction is executed next may depend on the result of an earlier instruction, which may not have completed yet, in which case waiting for the result of that instruction would cause a delay in processing. Therefore, to improve performance one of the possible instructions can be executed speculatively before it is known which instruction should actually have been executed, so that if the correct instruction is chosen then the delay can be avoided. If the wrong instruction is executed speculatively, then the processing pipeline can be flushed and the system can be restored to the state in which the processor was before the speculation point.

In a system using register renaming, it is sometimes desirable to track the occurrence of the speculation points. The present technique seeks to improve the efficiency of tracking the speculation points while performing register renaming.

SUMMARY

Viewed from one aspect, the present invention provides a data processing apparatus for processing a stream of program instructions, comprising first processing circuitry configured to process at least some of the program instructions, the first processing circuitry comprising:

a plurality of registers for storing data;

register renaming circuitry configured to map architectural register specifiers identified by the program instructions to physical register specifiers identifying the plurality of registers; and a renaming data store configured to store a plurality of renaming entries, each renaming entry for identifying a register mapping between at least one of the architectural register specifiers and at least one of the physical register specifiers; wherein:

at least some renaming entries have a corresponding count value, the count value indicating a number of speculation points occurring between generation of a previous count value and generation of the count value;

a speculation point comprising a point of program flow of the stream of program instructions following which at least one program instruction is executed speculatively by the data processing apparatus before it is known whether the at least one program instruction should have been executed following the speculation point; and the count value comprises an N-bit value, where N is an integer and N>1.

First processing circuitry is provided to process at least some instructions of a stream of program instructions. The first processing circuitry has some registers, and register renaming circuitry is provided to map architectural register specifiers to physical register specifiers. A renaming data store stores renaming entries identifying register mappings generated by the register renaming circuitry.

To be able to track the occurrence of speculation points in the stream of program instructions, previous implementations have added an additional renaming entry to the renaming data store each time a speculation point is encountered. The additional renaming entries can then be used to identify, on resolution of a speculation point, whether some renaming entries are still required. However, the present technique recognizes that adding additional renaming entries for each speculation point can be inefficient. For example, there may be several speculation points occurring in succession before another program instruction requiring a register mapping is executed by the first processing circuitry. In this case, adding several renaming entries corresponding to each speculation point can waste the available storage capacity of the renaming data store.

Instead, the present technique provides at least some renaming entries with a corresponding count value for indicating a number of speculation points occurring between generation of the previous count value for a previous renaming entry and generation of the count value. The count value is an N-bit value where N is an integer greater than 1 (i.e. the count value can indicate values of 2 or more). As the count value can indicate how many speculation points occurred before the count value was generated, it is not necessary to add a new renaming entry for each speculation point. Also, by counting the speculation points relative to the previous count value, the count value will have a smaller numeric value than if an absolute number of speculation points was counted, which will tend to allow fewer bits to be used for the count value. Also, as explained below the count values can enable the renaming data store to be placed in a power saving state more often than in previous techniques. Hence, the renaming data store can track how many speculation points have occurred in a more efficient way than with previous techniques.

The present technique can be useful in a system only having one processing circuitry, which is the first processing circuitry. There may be some occasions when several speculation points occur in succession without any intervening instructions which require a register mapping. In this case, the count value eliminates the need for multiple renaming entries which merely identify the occurrence of a speculation point and do not identify a register mapping. Instead, the system can wait until the next time a register mapping is required and then add a count value to the entry for that register mapping identifying the number of speculation points that have occurred.

However, the present invention is particularly useful in a system having second processing circuitry in addition to the first processing circuitry. The first processing circuitry may process a predetermined class of program instructions from the stream of instructions while the second processing circuitry may execute other program instructions. In such a system, it is likely that there will be periods when several speculation points occur in response to instructions executed by the second processing circuitry while there are no program instructions of the predetermined class to be processed by the first processing circuitry. In this situation, previous techniques would have generated many renaming entries for the first processing circuitry which serve solely to identify the occurrence of a speculation point and do not indicate any register mapping. In contrast, in the present technique, it is possible to wait until there is another instruction of the predetermined class which requires a register mapping, for which a register renaming entry can be added to the data store including a count value indicating how many speculation points have occurred since the previous count value was generated.

For example, the second processing circuitry may be a general purpose processor core for processing general purpose program instructions, while the first processing circuitry may be a data engine which processes a particular type of program instructions. For example, the data engine may process floating-point program instructions for performing floating-point operations, or single-instruction-multiple-data (SIMD) program instructions for performing SIMD operations. An example of the floating point instructions are the instructions of the VFP floating point architecture, and an example of the SIMD instructions is the NEON™ architecture, both architectures being provided by ARM® Limited of Cambridge, UK.

The technique using the count values is not essential for the second processing circuitry, which will typically have fewer periods when speculation points are occurring but no new register mappings are required, for instructions being executed by the second processing circuitry. However, the count value technique may also be used for the second processing circuitry if desired.

At least one renaming entry may identify a first register mapping to be used for the speculative execution of one of the at least one program instruction following a speculation point, and a second register mapping for restoring previous register state if the at least one program instruction should not have been executed following the speculation point. Until the speculation point has been resolved, so that it is known whether the speculative execution of the at least one program instruction was correct, the register renaming entry should be retained to allow the state to be restored using the second register mapping if the speculation was incorrect. By tracking the occurrence and resolution of the speculation points and identifying which renaming entries are associated with a particular speculation point using the count values, the renaming circuitry can determine whether particular register mappings are still required or can be discarded.

There may be multiple types of speculation point. For example, one type of speculation point is a branch operation. When a conditional branch instruction is encountered then, depending on whether a condition specified by the instruction is satisfied, the system may determine whether or not to branch to a target program instruction or continue with the next program instruction. The system may include a branch predictor which can predict whether a branch is likely to be taken or not, and either the next program instruction or the branch target instruction can be executed speculatively depending on whether the branch is predicted to be taken. Until it is known whether the prediction was correct, then one or more register renaming entries following branch instruction will need to be retained so that state can be restored if the prediction was incorrect. Hence, branch operations can be considered as the speculation points and the count value can indicate how many branch operations have occurred since the previous count value was generated.

Another type of speculation point may be a load/store operation for loading data from memory or storing data to memory. If a memory protection error or other type of error occurs during a load/store operation, then the load/store is typically aborted and an abort handling routine is executed. To improve performance following a load/store operation, some instructions may be speculatively executed on the assumption that the load/store operation will be carried out correctly and will not be aborted. However, if a memory abort does occur, then the speculatively executed instructions will need to be flushed, previous register state may need to be restored, and some abort handing instructions may need to be executed. Therefore, the load/store operation is also a type of speculation point following which some instructions are speculatively executed. A count value may be maintained to count how many load/store operations have occurred since the previous count value was generated.

Where there are a plurality of types of speculation points, then separate count values may be generated for each type of speculation point. At least some of the renaming entries may have a first count value corresponding to a first type of speculation point and a second count value corresponding to a second type of speculation point. There may also be more than two kinds of count value.

In some embodiments, the count value may indicate the number of unresolved speculation points occurring between generation of the previous count value and generation of the count value, where an unresolved speculation point is a speculation point for which, when generating the count value, it is unknown whether the at least one program instruction should have been executed following the speculation point. By tracking only unresolved speculation points, then if a speculation point occurs and is resolved before any count values are generated then it is not necessary to track this speculation point.

In other embodiments, the count value may indicate a number of speculation points including both unresolved speculation points and resolved speculation points. A resolved speculation point is a speculation point for which, when generating the count value, it is known whether the at least one program instruction should have been executed. This option can simplify the counting of the speculation points.

The system may comprise monitoring circuitry for generating a speculation point count indicating the number of speculation points detected in the stream of program instructions. This may be provided in various locations in the system. The monitoring circuitry could be provided in the first processing circuitry.

In the embodiment where there are first and second processing circuitry then the monitoring circuitry could also be provided in the second processing circuitry, and the speculation points that are counted by the monitoring circuitry may be caused by instructions executed in either the first or the second processing circuitry. For example, in a system comprising a processor core and a data engine, where the data engine corresponds to the first processing circuitry and the core corresponds to the second processing circuitry, the processor core may already have some monitoring circuitry for monitoring speculation points, and so the speculation point count generated by this monitoring circuitry could be reused by the first processing circuitry.

Count value generating circuitry in the first processing circuitry may generate the count value for a new renaming entry to be stored to the renaming data store based on the speculation point count generated by the monitoring circuitry. For example, when an instruction is to be executed by the first processing circuitry which requires a register mapping to be performed, then the register renaming circuitry provides the mapping to the renaming data store and a new renaming entry is stored including both the mapping and the count value.

The count value generating circuitry may maintain a reference count value to make generation of the count value more efficient. After generating a count value, the count value generating circuitry stores the newly generated count value as the reference count value. When generating a following count value, the count value generating circuitry calculates the difference between the speculation point count generated by the monitoring circuitry and the reference count value. This determines the number of speculation points which have occurred since the previous count value was generated. When generating an initial count value then the reference count value can be initialized to a value of zero.

The monitoring circuitry may also monitor whether the detected speculation points are resolved. For example, if the speculation point is a branch operation then the monitoring circuitry may be a branch monitor, while if the speculation point is a load/store operation then the monitoring circuitry may be a memory controller.

When a speculation point is resolved then the speculation point count may be decremented by 1, so that the speculation point count indicates the number of unresolved speculation points. In this case, the reference count value may also be decremented when a speculation point is resolved.

The first processing circuitry may have an eviction control circuitry for controlling eviction of renaming entries from the renaming data store in dependence upon the count values corresponding to the at least some renaming entries. The count values allow the eviction control circuitry to determine which speculation points are associated with which renaming entries, and hence which renaming entries can be evicted once the corresponding speculation points have been resolved.

Where there are multiple types of speculation points, and so there are first and second event count values corresponding to the different types, then the eviction control circuitry may perform a separate eviction control determination for each type of speculation point. Even if one type of speculation point has been resolved, the renaming entry may still be required because an earlier speculation point of a different type is still unresolved, and so a renaming entry is allowed to be evicted only if the eviction determination for each type of speculation point determines that the entry can be evicted.

It would be possible to provide an identifier in each renaming entry identifying the speculation point corresponding to the entry. For example, following a branch instruction at least one instruction may be executed speculatively, and for each register mapping generated for one of the speculatively executed instructions, the corresponding renaming entry may include an identifier of the branch instruction which triggered the speculative execution. This allows the system to track which renaming entries are still required in case a speculation turns out to be incorrect, and allows speculation points to be resolved in any order and renaming entries to be evicted from the renaming data store in any order.

However, it can be simpler and more efficient for the renaming data store to comprise a first-in-first-out (FIFO) data structure in which an older renaming entry, which has been in the renaming data store longer, must be evicted before a younger renaming entry can be evicted. Also, speculation points may be resolved in the same order as the order in which they were encountered. This simplifies the processing for determining whether renaming entries can be evicted, because the oldest unresolved speculation point will be associated with the oldest renaming entry having a corresponding count value, and so it is not necessary for the renaming entry to include an identifier of the speculation point.

In one example, the eviction control circuitry may have a resolution counter which generates a resolution count value indicating the number of resolved speculation points for which it is known whether the at least one program instruction should have been executed following the speculation point. For example, the resolution counter may receive signals from the monitoring circuitry, for example, to track when a speculation point was resolved.

The resolution count value may be used by the eviction control circuitry to determine when to evict renaming entries from the data store. If the count value for the oldest renaming entry in the renaming data store indicates a number of speculation points which is less than the number of resolved speculation points indicated by the resolution count value, then the speculation point associated with the oldest renaming entry has already been resolved, and so the eviction determination may determine that the oldest renaming entry can be evicted. This does not necessarily mean that the oldest renaming entry will be evicted immediately, because as mentioned above an eviction determination for a speculation point of a different type could still determine that the renaming entry must remain in the data store.

Following the resolution of a speculation point, it may be that multiple renaming entries can be evicted from the renaming data store. To allow space in the renaming data store to be reclaimed more quickly, the eviction control circuitry may also perform a further eviction determination for determining whether the next oldest renaming entry of the at least some renaming entries can be evicted. The at least one next oldest renaming entry can be evicted if the total number of speculation points indicated by the count values for the oldest renaming entry and the at least one next oldest renaming entry is less than the number of resolved speculation points indicated by the resolution count value. In this case, then any speculation points associated with the oldest renaming entry and the at least one next oldest renaming entry will have been resolved and so these renaming entries can be made available for eviction.

The further eviction determination is optional, and in some systems the eviction control circuitry may only perform the eviction determination for the oldest renaming entry. In this case, the eviction control circuitry would have to wait for a later processing cycle before evicting the next oldest renaming entry.

Alternatively, the further eviction determination can be extended to determine whether several next oldest renaming entries can be evicted in the same cycle. However, the logic for calculating and comparing the total of the count values for the oldest renaming entry and the at least one next oldest renaming entry becomes complex if many next oldest renaming entries are considered. To limit the circuit area required for this, the further eviction determination may determine whether a maximum of N next oldest renaming entries can be evicted, where N is an integer. For example, if N=1 then the eviction control circuitry can only evict the oldest renaming entry and one next oldest renaming entry in the same processing cycle and must wait for a further cycle to evict further entries.

The renaming data store, the count value generating circuitry and the eviction control circuitry can all be placed in a power saving state if there are no valid entries in the renaming data store. When the first processing circuitry is not executing any instructions that require register mappings, then the circuitry for tracking the occurrence of speculation points can be switched off or placed in a low power state to reduce power consumption. The circuitry can be restored to an active state when another instruction is encountered by the first processing circuitry which requires a register mapping. The power saving mode is possible because the count values indicate a relative number of speculation points, not an absolute value which would require all speculation points to be tracked.

Viewed from another aspect, the present invention provides a data processing apparatus for processing a stream of program instructions, comprising first processing means for processing at least some of the program instructions, the first processing means comprising:

a plurality of register means for storing data;

register renaming means for mapping architectural register specifiers identified by the program instructions to physical register specifiers identifying the plurality of register means; and renaming data storage means for storing a plurality of renaming entries, each renaming entry for identifying a register mapping between at least one of the architectural register specifiers and at least one of the physical register specifiers; wherein:

at least some renaming entries have a corresponding count value, the count value indicating a number of speculation points occurring between generation of a previous count value and generation of the count value;

a speculation point comprising a point of program flow of the stream of program instructions following which at least one program instruction is executed speculatively by the data processing apparatus before it is known whether the at least one program instruction should have been executed following the speculation point; and the count value comprises an N-bit value, where N is an integer and N>1.

Viewed from a further aspect, the present invention provides a data processing method for processing a stream of program instructions using a data processing apparatus comprising first processing circuitry configured to process at least some of the program instructions, the first processing circuitry comprising a plurality of registers for storing data;

the method comprising:

mapping architectural register specifiers identified by the program instructions to physical register specifiers identifying the plurality of registers; and storing a plurality of renaming entries in a renaming data store, each renaming entry for identifying a register mapping between at least one of the architectural register specifiers and at least one of the physical register specifiers; wherein:

at least some renaming entries have a corresponding count value, the count value indicating a number of speculation points occurring between generation of a previous count value and generation of the count value;

a speculation point comprising a point of program flow of the stream of program instructions following which at least one program instruction is executed speculatively by the data processing apparatus before it is known whether the at least one program instruction should have been executed following the speculation point; and the count value comprises an N-bit value, where N is an integer and N>1.

Viewed from another aspect, the present invention provides a data processing apparatus for processing a stream of program instructions, comprising first processing circuitry configured to process at least some of the program instructions, the first processing circuitry comprising:

a plurality of registers for storing data;

register renaming circuitry configured to map architectural register specifiers identified by the program instructions to physical register specifiers identifying the plurality of registers; and a renaming data store configured to store a plurality of renaming entries, each renaming entry for identifying a register mapping between at least one of the architectural register specifiers and at least one of the physical register specifiers; wherein:

at least some renaming entries have a corresponding count value, the count value indicating a number of speculation points occurring between generation of a previous count value and generation of the count value, the speculation points comprising branch operations or load/store operations; and the count value comprises an N-bit value, where N is an integer and N>1.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 illustrates an example sequence of program instructions;

FIG. 3 shows an example of renaming entries stored in a renaming data store of the processor core of the apparatus of FIG. 1;

FIG. 4 schematically illustrates a comparative example of renaming entries stored in the renaming data store of the data engine of FIG. 1 if the same technique used for the processor core was also used for the data engine;

FIG. 5 shows an example of the renaming entries stored in the renaming data store of the data engine according to the present technique;

DESCRIPTION OF EXAMPLE EMBODIMENTS

Figure 1:
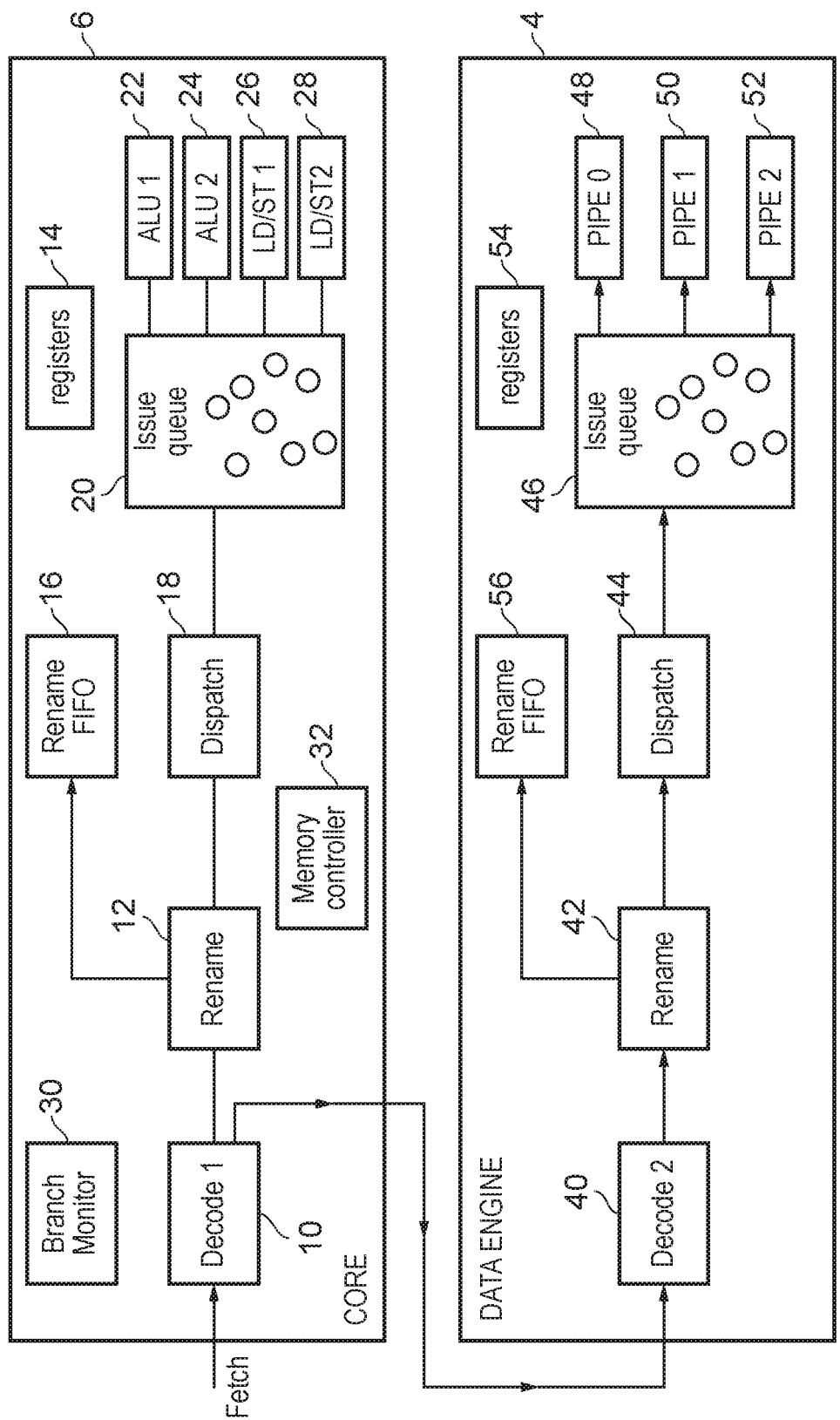
FIG. 1 schematically illustrates a data processing apparatus.

FIG. 1 schematically illustrates a data processing apparatus 2 comprising first processing circuitry 4 and second processing circuitry 6. In this example the second processing circuitry 6 comprises a processor core for performing general purpose processing operations and the first processing circuitry 4 comprises a data engine for performing a specific type of processing operations, for example floating-point operations or SIMD operations. Further processing units may also be provided if desired.

The processor core 6 has a decode stage 10 for decoding instructions fetched from a memory system or an instruction cache. If the decode stage 10 determines that the fetched instruction is a type of instruction to be executed by the data engine, then it is sent to the data engine 4. Otherwise, the decode stage 10 decodes the fetched instruction and passes it to a rename stage 12 for performing register renaming. The rename stage 12 maps architectural register specifiers identified by the decoded instructions to physical register specifiers identifying physical registers 14. The rename stage 12 outputs data identifying a register mapping to a rename data store 16 for storing renaming entries identifying register mappings. The rename data store 16 has a first-in-first-out (FIFO) structure in which an older entry must be evicted from the data store before a younger entry can be evicted. Further details of the rename data store 16 will be described below.

After the rename stage 12, the instruction is passed to the dispatch stage 18 which dispatches the instructions to the issue queue 20. The instructions in the issue queue 20 can be issued to one of several execution pipelines 22, 24, 26, 28 when all the operands required by the instruction are available. The processor core 6 is capable of out-of-order execution so that while an earlier instruction in the program order is waiting for an operand to become available, a later instruction in the program flow order can be issued ahead of the earlier instruction. The execution pipeline includes two arithmetic logic unit (ALU) pipelines 22, 24 and two load/store pipelines 26, 28. Other types and numbers of pipelines are possible. The execution pipelines use data from the registers 14, which are accessed according to the register mappings indicated in the renaming store 16. The processor core 6 also includes a branch monitor 30 for detecting branch instructions in the stream of fetched program instructions and for monitoring the outcome of branch instructions, and a memory controller 32 for controlling accesses to a memory (not illustrated in FIG. 1) in response to load/store operations carried out by the load/store pipelines 26, 28.

The data engine 4 includes a second decode stage 40 for decoding data engine instructions sent to the data engine 4, a rename stage 42 which performs register renaming in a similar way to the rename stage 12 of the core 6, a dispatch stage 44 for dispatching instructions to an issue queue 46, multiple execution pipelines 48, 50, 52 for executing instructions, and a set of physical registers 54 for storing data for use when executing instructions. A rename data store 56 stores renaming data entries identifying register mappings produced by the rename stage 42. The elements of the data engine 4 are similar to the corresponding elements of the processing core 6 and will not be described in detail, apart from the rename data store 56. As for the processor core 6, the data engine 4 can perform out-of-order execution. While FIG. 1 shows an example having a core 6 and a data engine 4, in other embodiments there may just be one processor which has a rename data store similar to the rename data store 56 of the data engine 4.

Figure 1A:
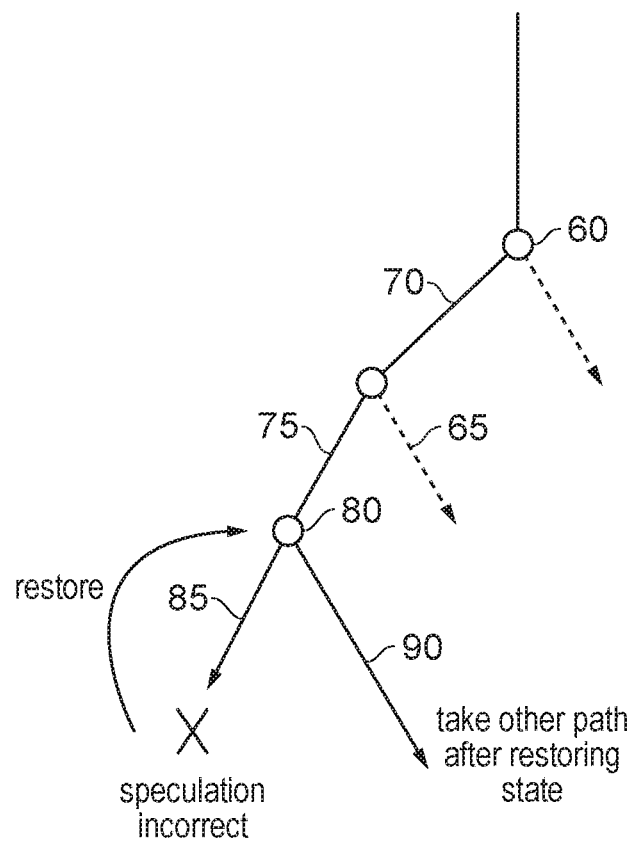
FIG. 1A illustrates an example of a program flow including speculation points.

FIG. 1A shows an example of a program flow including speculative execution of some program instructions. Each line in FIG. 1A represents a sequence of one or more program instructions and each circle represents a speculation point. Following a speculation point, there are several possible program instructions which could be executed. For example, the speculation point may be a branch instruction, and whether or not the branch is taken may depend on whether a condition is satisfied. To avoid a delay while determining whether the branch is taken or not, the branch monitor 30 can predict whether the branch is likely to be taken, and the core 4 or data engine 6 can speculatively execute a block of one or more instructions following the branch. If the branch is predicted taken then the block of instructions at the branch target address is speculatively executed, while if the branch is predicted not taken, then an instruction at the next instruction address can be executed.

For speculation points 60, 65 shown in FIG. 1A, the blocks 70, 75 of program instructions are speculatively executed, and it is later determined that the speculation was correct. Therefore, for these speculation points 60, 65 the speculation has resulted in a performance improvement since it was not necessary to wait to determine which outcome is correct before executing the instructions 70, 75.

On the other hand, for speculation point 80, block 85 of program instructions is executed speculatively, but it is then determined that the speculation is incorrect. The core 4 or data engine 6 then restores the processor state to the state that was present when the speculation point 80 was encountered, and then switches to executing the path 90 of instructions which should have been executed. In this case, there is a delay, but if the prediction of the instructions to be executed speculatively is correct often enough, then the performance gains from correct predictions can outweigh the delay caused by a misprediction.

Another example of a speculation point is a load/store operation. The processor can speculatively execute a block of instructions following the load/store operation, on the assumption that the load/store operation will be carried out correctly and will not cause an abort. If the load/store operation causes an abort, then the speculatively executed instructions may need to be flushed from the pipeline and an abort handler may need to be executed. Hence, the load/store operation is also a speculation point following which at least one program instruction can be executed speculatively.

The speculative execution of instructions shown in FIG. 1A can affect the renaming data which is stored in the remaining store 16, 56 of the processor core 6 and the data engine 4. For the speculatively executed instructions following the speculation point, the rename stage 12, 42 may have generated register mappings and stored corresponding renaming entries in the data store 16, 56. If the speculation turns out to be incorrect, some previous state may need to be recovered. The renaming entry can identify a physical register which stores the data which is to be restored if the speculation turns out to be incorrect. Therefore, while a speculation point remains unresolved, the renaming entry for a speculatively executed instruction following the speculation point should remain within the renaming data store 16, 56 in case the speculation is incorrect. To track how long renaming entries need to remain within the data store, it is therefore necessary to track the occurrence of speculation points and when the speculation points are resolved.

FIG. 2 shows an example sequence of program instructions to be executed by the apparatus 2 of FIG. 1. Instructions C0, C1, etc. are instructions to be executed by the core 6. Instructions D2, D3, etc. are instructions to be executed by the data engine 4. Instructions BR0, BR1 etc. are branch instructions. While this example uses branch instructions as an example of a speculation point, other types of speculation points, such as load/store operations, could also occur.

FIG. 3 shows an example of renaming entries stored in the renaming store 16 of the core 6 in response to the instructions shown in FIG. 2. For each core instruction C0 to C5 the renaming entry includes a mapping from an architectural register specifier (Arch) identified in the instruction to a physical register specifier (Ren) identifying a corresponding physical register 14 for storing the operand that is identified by the architectural register specifier in the instruction encoding. If the instruction follows a branch instruction, then the entry may also include a recovery register specifier (Rec) identifying a physical register 14 which stores the data to be restored if the speculative execution following the branch instruction was incorrect. Each time a branch instruction BR1-BR4 is detected, a new renaming entry is added to the data store 16 with a tag value (Spec) set to a value of 1 to distinguish it from the entries corresponding to the instructions, for which the tag value is 0. Generally, the renaming entry corresponding to a branch instruction does not need to include a register mapping, although sometimes for branch and link instructions there may be a register mapping from an architectural register specifier Rx to a physical register specifier Ry.

As shown in FIG. 3, providing a new renaming entry for each branch instruction results in additional renaming entries even if there is no register mapping being generated. For the core 6, the extra expense of storing entries for branch instructions is not usually significant, since often the core 6 will execute many core instructions between successive branch instructions. However, as shown in FIG. 4 if the same technique was used for the data engine 4 then this would result in most of the renaming entries being used to indicate branch instructions rather than register mappings. Typically, there will be many more branch instructions executed by the data processing apparatus 2 than data engine instructions executed by the data engine 6. For example, there may be some periods when no data engine instructions are being executed. In this case, adding a new renaming entry for each branch instruction to track the occurrence of speculation points would waste space in the renaming data store 56 of the data engine 4 and incur unnecessary power consumption in tracking the occurrence of branches when the renaming data store 56 is not required for any data engine instructions.

FIG. 5 shows a more efficient way of tracking the occurrence of speculation points in the renaming data store 56 of the data engine 4. Again, each entry specifies a mapping from an architectural register specifier 90 to a physical register specifier 92. If the renaming entry follows a speculation point then the entry also specifies a recovery register specifier 94 identifying a physical register storing the data to be restored if the speculative execution was incorrect. The entry also includes a delta count value 96 (Δ) which indicates the number of speculation points (in this example, branch instructions) which have occurred since the previous delta count value was generated. No renaming entries are generated in response to speculation points, unless the speculation point (e.g. a branch and link instruction) also requires a register mapping.

FIG. 5 shows the renaming entries generated for the example sequence of instructions of FIG. 2. When the first data engine instruction D2 is encountered the renaming data store 56 stores a renaming entry 100 with a delta count value Δ equal to 2 indicating that two branch instructions BR0, BR1 were detected before the data engine instruction D2. For the next data engine instruction D3, the delta count value Δ is 0 because no further branch instructions were executed between instruction D2 and instruction D3. For a later data engine instruction D5, the delta count value Δ is again 2 because two more branch instructions BR2, BR3 have been detected since the previous count value for instruction D3 was generated. This technique means that a renaming entry is only necessary when a data engine instruction is executed by the data engine 4. Since there is no need to track the occurrences of branch instructions when there are no data engine instructions being executed, then the renaming data store 56 can be placed in a low power state when it becomes empty to conserve energy.

The technique shown in FIG. 5 from the data engine 4 may also be used for the processor core 6. However, the general purpose processor core 6 would be less likely than the data engine 4 to have periods when it is not executing any instructions requiring register mappings, and so the use of the count values is usually more useful for the data engine 4 than the core 6.

As mentioned above, there may be multiple types of speculation points such as branch instructions and they store operations. The renaming data store 56 may maintain separate delta count values 96 for each type of speculation point, each delta count value indicating the number of speculation points of the corresponding type that have occurred since the previous count value of the same type was generated.

Figure 6:
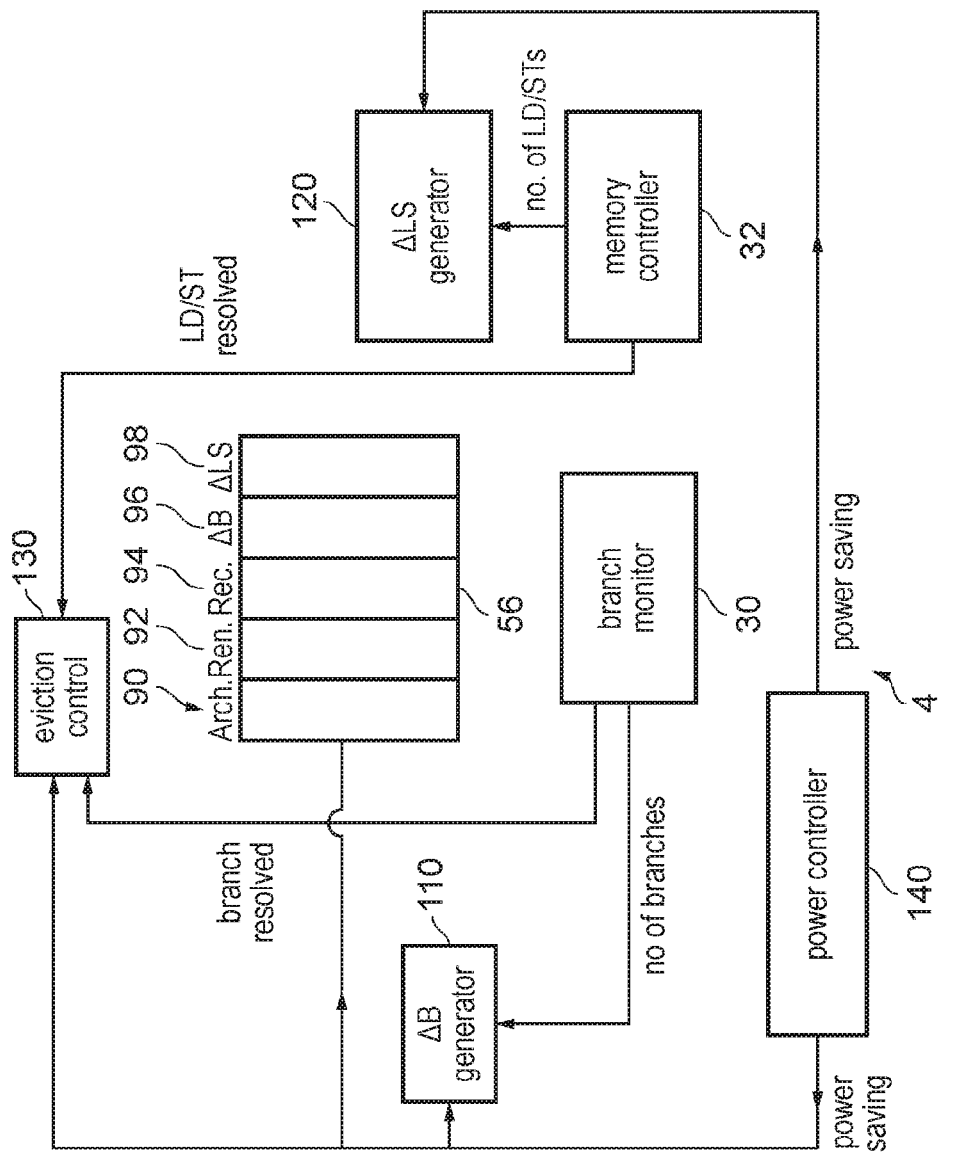
FIG. 6 shows an example of the renaming data store including circuitry for generating count values and for controlling eviction of renaming entries.

FIG. 6 shows in more detail the processing circuitry for generating the delta count values and controlling eviction of register renaming entries from the renaming data store 56 based on the count values. As before, each entry renaming includes fields for storing an architectural register specifier 90, a physical register specifier 92 and a recovery register specifier 94. However, in this embodiment there are two delta tag fields 96, 98, one corresponding to branch instructions and the other corresponding to load/store operations. If there are other types of speculation point, then further count values could be provided. A first count value generator 110 generates the count values 96 (ΔB) corresponding to branch operations based on an indication of the number of detected branch operations from the branch monitor 30. A second count value generator 120 generates the count values 98 (ΔLS) corresponding to load/store operations based on an indication of the number of load/store operations received from the memory controller 32. In this embodiment, the data engine 4 receives the indications of the number of branches and load/store operations from the branch monitor 30 and memory controller 32 in the processor core 6, although it is also possible for the data engine 4 to have its own branch monitor 30 or memory controller 32.

An eviction controller 130 controls eviction of renaming entries from the renaming data store 56 based on the delta count values 96, 98. A power controller 140 is also provided for controlling the supply of power to the delta count value generators 110, 120, the eviction controller 130 and the renaming data store 56. When there are no valid renaming entries in the data store 56 then these elements are placed in a low power state by the power controller 140 to conserve energy.

In the example described with respect to FIGS. 6 to 11, the indications of the number of branches and load/store events received from the branch monitor 30 and memory controller 32, and the count values 96, 98 indicate a number of unresolved speculation points, for which at the time of generating a particular count value it is not yet known whether the speculative execution was correct. However, it would also be possible for these values to indicate a total number of speculation points, including both unresolved and resolved speculation points.

Figure 7:
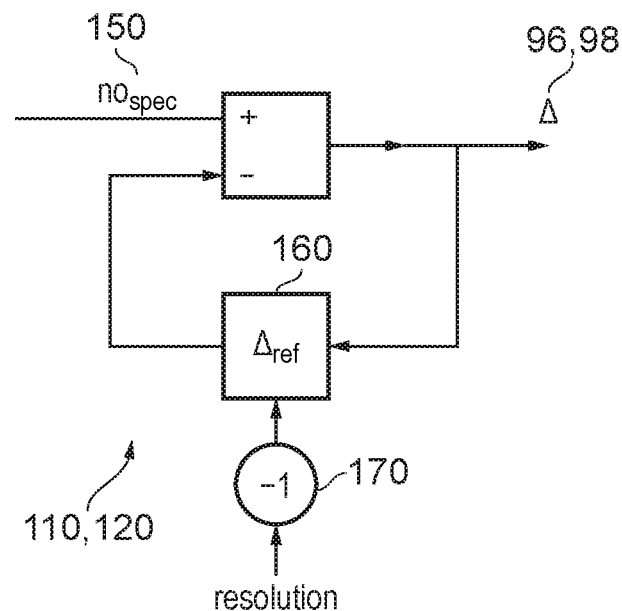
FIG. 7 shows an example of count value generating circuitry.

FIG. 7 schematically illustrates an example of a count value generator, which can be used for both the first and second count value generators 110, 120. A speculation point count signal 150 ($no_{spec}$) is received from the branch monitor 30 or memory controller 32 indicating the number of speculation points of the appropriate type that have been detected. The count value generator 110, 120 calculates the corresponding count value 96, 98 by subtracting a reference count value 160 ($\Delta_{ref}$) from the speculation point count signal 150. After the count value 96, 98 has been generated then the new count value replaces the old reference count value 160, so that the following count value will be generated relative to the previous count value.

As the speculation point count signal 150 indicates a number of unresolved speculation points in this embodiment, then when a speculation point is resolved then the branch monitor 30 or memory controller 32 will decrement the speculation point count signal 150 to indicate fewer unresolved speculation points. The count value generator 110, 120 has logic 170 for decrementing the reference count value 160 in a similar way in response to a speculation point being resolved, so that the resolution of an earlier speculation point does not affect the counted number of later speculation points which have occurred since the previous count value was generated. In systems where the branch monitor 30 or memory controller 32 does not decrement the signal 150 in response to a resolved speculation point, then the decrementing logic 170 may not be necessary.

Figure 8:
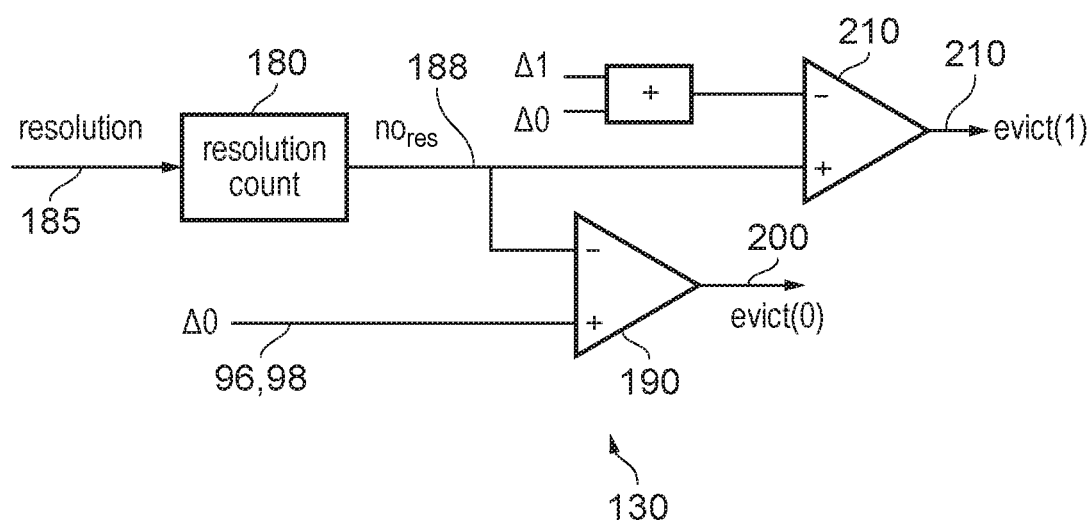
FIG. 8 shows an example of eviction control circuitry.

FIG. 8 shows an example of the eviction control circuitry 130 for controlling eviction of entries from the renaming data store 56. The eviction control circuitry 130 shown in FIG. 8 may be duplicated for each type of speculation point to determine separately for each type of speculation point whether an entry can be evicted based on the delta count value of the corresponding type. If there are multiple types of delta count value, then an entry can be evicted only if the eviction determination based on each type of delta count value indicates that the entry can be evicted.

The eviction controller 130 has a resolution counter 180 for counting the number of resolved speculation points in response to a resolution signal 185 received from the branch monitor 30 (in the case of branches) or the memory controller 32 (in the case of load/stores). Each time the resolution signal indicates that a speculation point has been resolved, the resolution counter 180 increments the resolution count signal 188 (no$_{res}$). The eviction controller 130 controls eviction according to a first-in-first-out scheme so that the oldest entry in the data store 56 must be evicted before a later entry can be evicted. To determine whether the oldest entry can be evicted, a comparator 190 compares the delta count value $\Delta 0$ of the oldest entry with the resolution count signal 188 produced by the resolution counter 180. If the number of resolved speculation points is greater than or equal to the delta count value $\Delta 0$ of the oldest entry, then an eviction signal 200 is generated with a state indicating that the oldest entry may be evicted. On the other hand, if the number of resolved speculation points indicated by the resolution count signal 188 is less than the delta count value $\Delta 0$ of the oldest entry in the renaming data store 56, then the eviction signal 200 has a state indicating that the oldest entry cannot be evicted. Even if the eviction signal 200 indicates that the oldest entry may be evicted, this does not necessarily mean that the entry is actually evicted. If an eviction controller 130 for a different type of speculation point determines that the entry is still required, then it will not yet be evicted.

Similarly, the eviction controller 130 may determine for the next oldest entry of the data store 56 whether it can be evicted based on its delta count value $\Delta 1$. A second comparator 210 compares the total of the delta values $\Delta 0 + \Delta 1$ of the oldest and next oldest entries in the data store 56 with the resolution count value 188 indicating the number of resolved speculation points. If the number of resolved speculation points is greater than or equal to the total of the count values $\Delta 0 + \Delta 1$ then an eviction signal 210 is set to indicate that next oldest entry can also be evicted. Again, whether the next oldest entry is actually evicted will depend upon whether an eviction determination using another type of count value has also determined that the entry can be evicted.

While FIG. 8 shows an example of eviction control circuitry 130 which determines whether the oldest and next oldest entries in the data store 56 can be evicted, it would also be possible to provide circuitry for detecting whether further entries could also be evicted in the same cycle. Eviction of each further entry can be determined based on the sum of the count values corresponding to all preceding entries and the further entry. However, there will be a balance between the number of entries that can be evicted in the same cycle and the complexity of the processing logic required for adding and comparing the count values of the different entries. Hence, it may be more efficient to limit the number of further entries which can be evicted in the same cycle, to reduce the amount of circuit area incurred by the eviction controller.

Also, the eviction controller 130 of FIG. 8 shows an example of comparing the delta count value $\Delta$ to determine whether entries can be evicted. However, in practice there will be several entries which have a delta count value equal to 0, indicating that no speculation points occurred between generation of the delta count value for a previous instruction and generation of the current delta count value. While eviction of such entries could be controlled with a similar structure to the eviction controller 130 shown in FIG. 8, this can be inefficient.

Instead, an entry for which the delta count value is 0 can be evicted when a previous entry having a non-zero delta count value is evicted, since there will be no further speculation points occurring between generation of the two entries. Hence, when the eviction controller 130 determines that an entry with a non-zero delta count value should be evicted, then any subsequent entries having delta count values of zero can also be evicted automatically without performing any comparison of delta count values with the resolution count signal 180. For instance, in the example shown in FIG. 5, when the entry corresponding to instruction D2 is evicted from a data store, then the entry corresponding to instruction D3 can be evicted automatically because its delta count value is equal to 0. If there are multiple types of delta count value corresponding to different types of speculation point, then all the delta count values for the entry would have to be zero in order for it to be evicted automatically following eviction of an earlier renaming data entry.

Figure 9A:
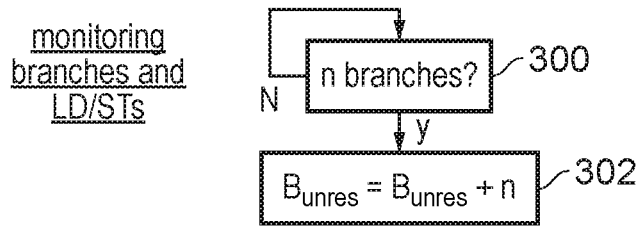
FIGS. 9A to 9D illustrate methods of monitoring the occurrence and resolution of different types of speculation point.
Figure 9B:
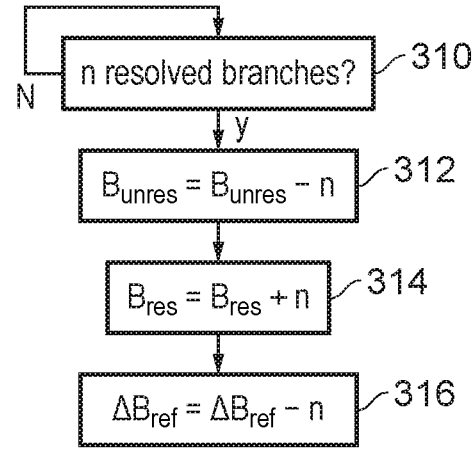
Figure 9C:
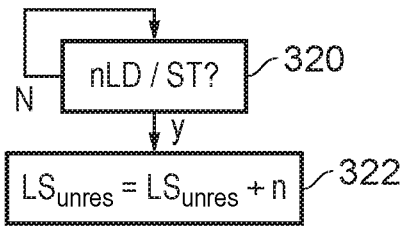
Figure 9D:
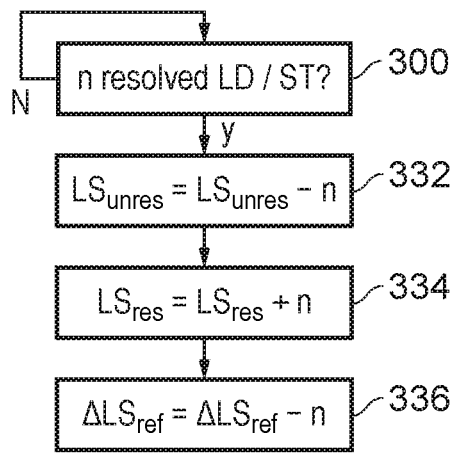
Figure 10:
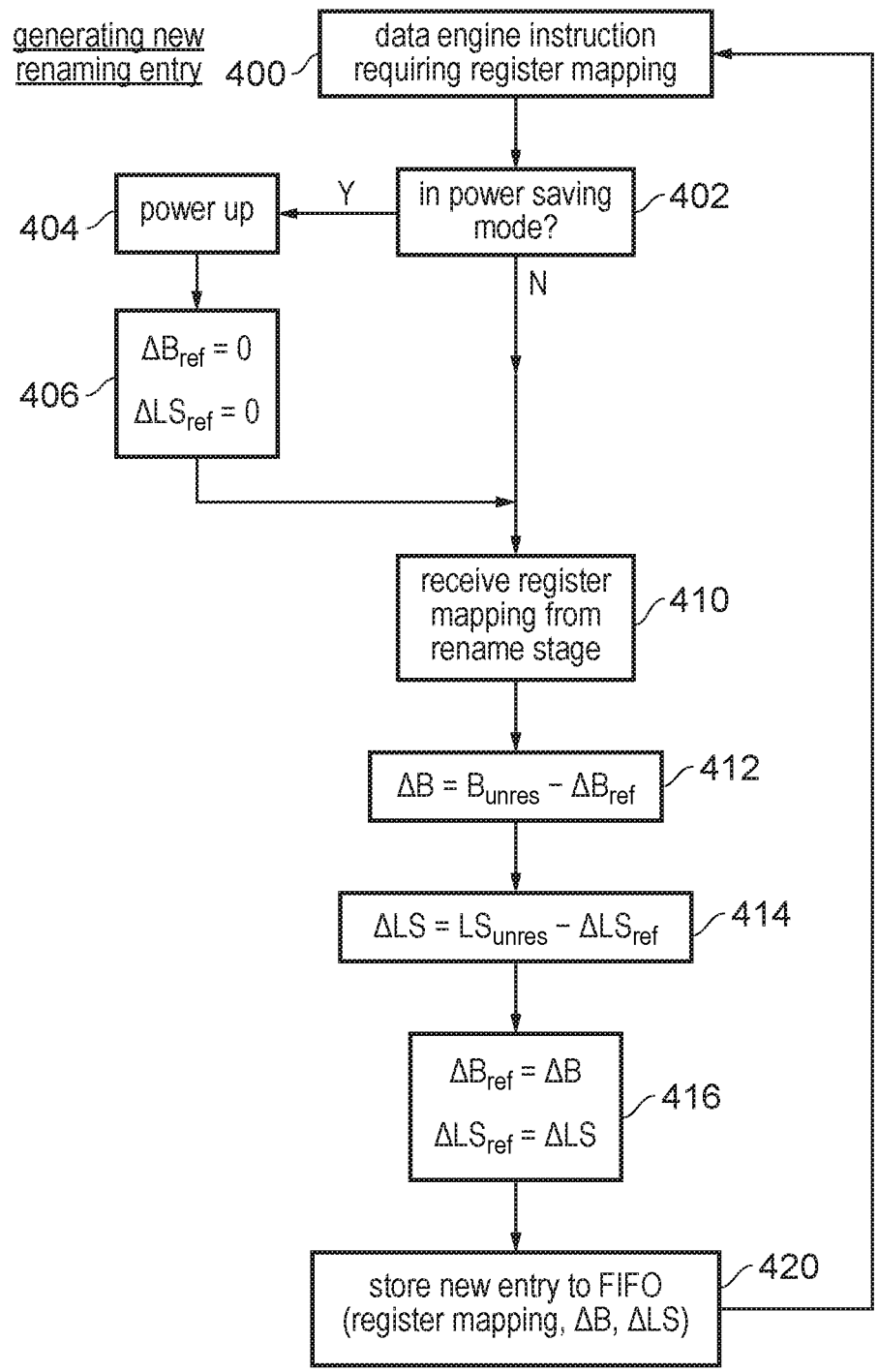
FIG. 10 shows a method of generating a new renaming entry including at least one count value indicating the number of speculation points which have occurred since previous count value was generated.
Figure 11:
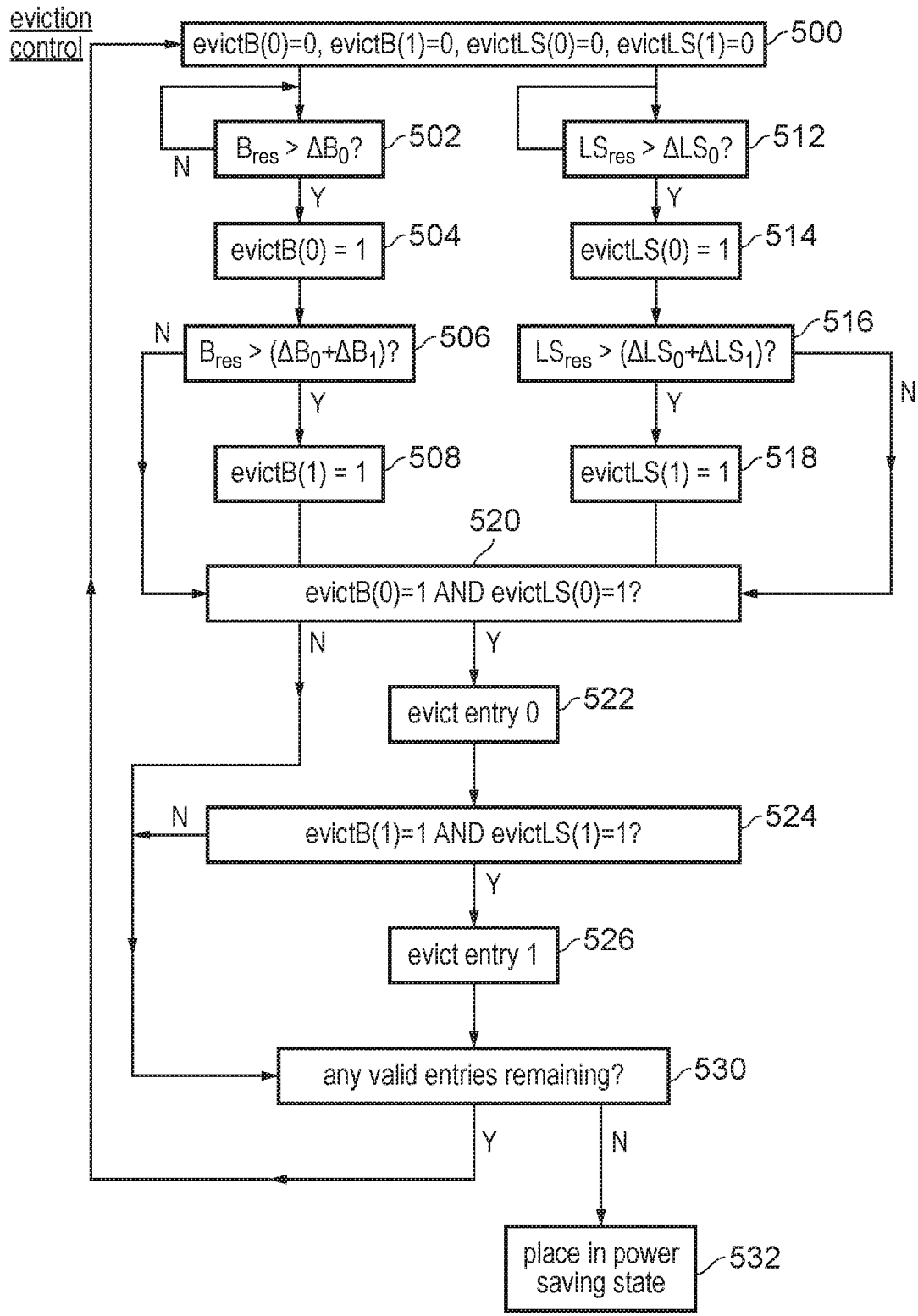
FIG. 11 shows a method of controlling eviction of renaming entries from the renaming data store.

FIGS. 9 to 11 show flow diagrams illustrating an example method of controlling the generation of delta count values and the eviction of entries from the data store 56. The following parameters are referred to in FIGS. 9 to 11:

$B_{unres}$ is the number of unresolved branches detected by branch monitor 30 (corresponding to signal 150 in FIG. 7).

$B_{res}$ is the counted number of resolved branches (corresponding to signal 188 in FIG. 8).

$\Delta B$ is the branch count value generated for a new renaming entry indicating the number of branches which have occurred since a previous count value was generated. $\Delta B_0$ is the branch count value for the oldest entry in the renaming data store and $\Delta B_1$ is the branch count value for the next oldest entry in the renaming data store.

$\Delta B_{ref}$ is the reference count value for branches (corresponding to the reference value 160 in FIG. 7).

$LS_{unres}$ is the number of unresolved load/store operations detected by memory controller 32 (corresponding to signal 150 in FIG. 7).

$LS_{res}$ is the counted number of resolved load/store operations (corresponding to signal 188 in FIG. 8).

ΔLS is the load/store count value generated for a new renaming entry indicating the number of load/store operations which have occurred since a previous count value was generated. $\Delta LS_0$ is the load/store count value for the oldest entry in the renaming data store and $\Delta LS_1$ is the load/store count value for the next oldest entry in the renaming data store.

$\Delta LS_{ref}$ is the reference count value for load/store operations (corresponding to the reference value 160 in FIG. 7).

evictB(0) is the eviction signal 200 indicating whether, based on the count values ΔB for branch operations, the oldest entry in the renaming data store 56 can be evicted.

evictB(1) is the eviction signal 210 indicating whether, based on the count values ΔB for branch operations, the next oldest entry in the renaming data store 56 can be evicted.

evictLS(0) is the eviction signal 200 indicating whether, based on the count values ΔLS for load/store operations, the oldest entry in the renaming data store 56 can be evicted.

evictLS(1) is the eviction signal 210 indicating whether, based on the count values ΔLS for load/store operations, the next oldest entry in the renaming data store 56 can be evicted.

FIGS. 9A to 9D show methods for monitoring the occurrence and resolution of speculation points. FIG. 9A shows a method of monitoring the occurrence of branch operations by the branch monitor 30. At step 300, it is determined whether n branches have occurred, where n is an integer greater than 0. If any branches have occurred then at step 302 the number of unresolved branches $B_{unres}$ is incremented by n. In most systems, n=1. However, some systems may be able to encounter multiple branches per cycle, in which case n may be greater than 1.

FIG. 9B shows a technique for monitoring the resolution of branches. At step 310 the branch monitor determines whether n branches have been resolved in the current processing cycle. If so then at step 312 the number of unresolved branches $B_{unres}$ is decremented by n while at step 214 the number of resolved branches $B_{res}$ is incremented by n. Also at step 216 the branch count value generator 110 decrements the reference count value $\Delta B_{ref}$ by n so that the generated count value ΔB will still indicate the number of branches that have occurred since the previous count was generated.

FIGS. 9C and 9D show steps 320 to 336 which are the same as steps 300 to 316 of FIGS. 9A and 9B, but which are performed for load/store operations instead of branch operations.

FIGS. 9A to 9D show an example where, in response to a resolved branch or load/store operation, the branch monitor 30 or memory controller 32 decrements the number of branches $B_{unres}$ or load/stores $LS_{unres}$ at steps 312 or 332. In other systems, this step may be omitted so that the speculation point count instead indicates the total number of speculation points that have occurred, irrespective of whether they have been resolved or not. In this case, steps 316 and 336 of decrementing the reference count value can also be omitted.

FIG. 10 shows a method of generating the delta count values ΔB and ΔLS for a new entry of the renaming data store 56. At step 400, the rename stage 42 of the data engine 4 encounters a data engine instruction which requires a register mapping. At step 402, the power controller 140 determines whether the renaming data store 56 and its associated control circuitry 110, 120, 130 are currently in the power saving mode. If so, then at step 404 the power supply is increased and the circuitry 56, 110, 120, 130 is placed in the active mode. At step 406, the reference count values 160 in the count value generators 110, 120 are initialized to zero (while this step is shown as an active step in FIG. 10, the initialization to zero may occur automatically during power up, as zero may be the default value which exists in a storage element when it is first powered up). If the renaming data store 56 was not in the power saving mode then steps 404 and 406 are omitted.

At step 410 the renaming data store 56 receives a newly generated register mapping from the rename stage 42. The register mapping includes an architectural register specifier, a corresponding physical register specifier and, optionally, a recovery register specifier. At step 412, the delta count value generator 110 generates the branch count value ΔB by subtracting the reference branch count value $\Delta B_{ref}$ from the number of detected branches $B_{unres}$ output by the branch monitor 30. At step 414, the load/store delta count generator 120 generates the load/store count value ΔLS by subtracting the load/store reference count value $\Delta LS_{ref}$ from the number of detected load/store operations $LS_{unres}$ provided by the memory controller 32. At step 416 the count value generators 110, 120 replace the previous reference count values $\Delta B_{ref}$, $\Delta LS_{ref}$ with the newly calculated count values ΔB, ΔLS. At step 420, the renaming data store 56 stores a renaming new entry to the FIFO data structure, the renaming entry indicating the register mapping received at step 410 and the count values ΔB, ΔLS generated at steps 412, 414.

FIG. 11 shows a method of controlling eviction of a renaming entry from the renaming data store 56 using eviction controller 130. At step 500 the eviction signals evictB(0), evictB(1), evictLS(0), evictLS(1) are initialized to zero. At step 502, the eviction controller determines whether the number of resolved branches $B_{res}$ is greater than the branch count value $\Delta B_0$ for the oldest renaming entry. If not, then no eviction is carried out and processing continues until this condition is satisfied. Eventually, enough branches will be resolved such that the number of resolved branches is greater than the branch count value $\Delta B_0$, and at step 404 the eviction signal evictB(0) is set to 1. At step 506 it is then determined whether the total of the branch count values $\Delta B_0$ and $\Delta B_1$ for the oldest and next oldest renaming entries is less than the number of resolved branches $B_{res}$. If so, then at step 508 the eviction signal evictB(1) is set to 1. Otherwise, step 508 is omitted and eviction signal evictB(1) still has a value of 0.

Meanwhile, the eviction controller 130 also performs steps 512, 514, 516, 518 which are the same as steps 502, 504, 506, 508 respectively, but which are performed for load/store operations instead of branch operations, using the load/store count values $\Delta LS_0$ and $\Delta LS_1$ and number of resolved load/store operations $LS_{res}$.

At step 520, it is determined whether the eviction signals evictB(0) and evictLS(0) are both equal to 1. If so, then at step 522 the oldest renaming entry is evicted from the renaming data store 56. On the other hand, if at least one of signals evictB(0) and evictLS(0) is 0, then the oldest renaming entry cannot be evicted because the register mapping in the oldest renaming entry may still be required in case an earlier speculation point is determined to be mispredicted.

Similarly, at step 524 it is determined whether the eviction signals evictB(1) and evictLS(1) for the next oldest entry are both equal to 1, and if so then at step 526 the next delta entry is also evicted. If at least one of these signals is 0 then step 526 is omitted.

At step 530, it is determined whether there are any valid entries remaining in a data store. If not, then at step 532 the renaming data store 56 and the associated count value generating circuitry 110, 120 and eviction control circuitry 130 (including the resolution counter 180) are placed in a power saving state by the power controller 140. If there are still some valid renaming entries then the method goes back to step 500 to determine in a subsequent processing cycle whether eviction of a renaming entry is possible.

In summary, by storing a count value indicating the number of speculation points which have occurred since the previous count value was generated, fewer renaming entries are required compared to the previous technique shown in FIG. 4, and the logic associated with the renaming data store can be powered down when there are no instruction requiring a register mapping. Therefore, this saves processing resource and power consumption.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus for processing a stream of program instructions, comprising first processing circuitry configured to process at least some of the program instructions, the first processing circuitry comprising:
    a plurality of registers for storing data;
    register renaming circuitry configured to map architectural register specifiers identified by the program instructions to physical register specifiers identifying the plurality of registers; and
    a renaming data store configured to store a plurality of renaming entries, each renaming entry for identifying a register mapping between at least one of the architectural register specifiers and at least one of the physical register specifiers; wherein:
    at least some renaming entries have a corresponding count value, the count value indicating a number of speculation points occurring between generation of a previous count value for a previous renaming entry and generation of the count value;
    a speculation point comprising a point of program flow of the stream of program instructions following which at least one program instruction is executed speculatively by the data processing apparatus before it is known whether the at least one program instruction should have been executed following the speculation point; and
    the count value comprises an N-bit value, where N is an integer and N>1.

2. The data processing apparatus according to claim 1, wherein the first processing circuitry is configured to process a predetermined class of program instructions from the stream of program instructions; and
    the second processing circuitry is configured to process other program instructions from the stream of program instructions.

3. The data processing apparatus according to claim 2, wherein the predetermined class of program instructions comprises program instructions for performing floating-point operations.

4. The data processing apparatus according to claim 2, wherein the predetermined class of program instructions comprises program instructions for performing single-instruction-multiple-data (SIMD) operations.

5. The data processing apparatus according to claim 1, wherein at least one renaming entry identifies:
    (a) a first register mapping to be used for the speculative execution of one of the at least one program instruction following a speculation point; and
    (b) a second register mapping for restoring previous register state if the at least one program instruction should not have been executed following the speculation point.

6. The data processing apparatus according to claim 1, wherein the speculation points include a plurality of types of speculation points.

7. The data processing apparatus according to claim 6, wherein the plurality of types of speculation points include at least one of branch operations and load/store operations.

8. The data processing apparatus according to claim 6, wherein the at least some renaming entries have a corresponding first count value indicating the number of unresolved speculation points of a first type occurring between generation of a previous first count value and generation of the first count value, and a corresponding second count value indicating the number of unresolved speculation points of a second type occurring between generation of a previous second count value and generation of the second count value.

9. The data processing apparatus according to claim 8, wherein the first processing circuitry comprises eviction control circuitry configured to control eviction of renaming entries from the renaming data store;
    wherein the eviction control circuitry is configured to perform a first eviction determination for determining whether a renaming entry of the at least some renaming entries can be evicted based on the first event count values, and to perform a second eviction determination for determining whether the renaming entry can be evicted based on the second event count values; and
    the eviction control circuitry is configured to allow the renaming entry to be evicted if both the first eviction determination and the second eviction determination determine that the oldest renaming entry can be evicted.

10. The data processing apparatus according to claim 1, wherein the count value indicates a number of unresolved speculation points occurring between generation of the previous count value and generation of the count value, an unresolved speculation point comprising a speculation point for which, when generating the count value, it is unknown whether the at least one program instruction should have been executed following the speculation point.

11. The data processing apparatus according to claim 1, comprising monitoring circuitry configured to generate a speculation point count indicating the number of speculation points detected in the stream of program instructions;
    wherein the first processing circuitry comprises count value generating circuitry configured to generate the count value for a new renaming entry in dependence on the speculation point count generated by the monitoring circuitry.

12. The data processing apparatus according to claim 11, wherein:
    after generating the count value, the count value generating circuitry is configured to store the generated count value as a reference count value; and
    the count value generating circuitry is configured to generate a following count value by calculating a difference between the speculation point count generated by the monitoring circuitry and the reference count value.

13. The data processing apparatus according to claim 12, wherein the monitoring circuitry is configured to monitor whether the detected speculation points are resolved, wherein a speculation point is resolved when it is known whether the at least one program instruction should have been executed following the speculation point;

the speculation point count generated by the monitoring circuitry indicates the number of unresolved speculation points detected in the stream of program instructions; and the count value generating circuitry is configured to decrement the reference count value in response to resolution of a speculation point.

14. The data processing apparatus according to claim 11, comprising power control circuitry configured to place at least the count value generating circuitry in a power saving state if there are no valid renaming entries in the renaming data store.

15. The data processing apparatus according to claim 1, wherein the first processing circuitry comprises eviction control circuitry configured to control eviction of renaming entries from the renaming data store in dependence upon the count values corresponding to the at least some renaming entries.

16. The data processing apparatus according to claim 15, wherein the eviction control circuitry comprises a resolution counter configured to generate a resolution count value indicating the number of resolved speculation points for which it is known whether the at least one program instruction should have been executed following the speculation point.

17. The data processing apparatus according to claim 16, wherein the eviction control circuitry is configured to perform an eviction determination for determining whether the oldest renaming entry of the at least some renaming entries can be evicted from the renaming data store; and if the count value for the oldest renaming entry indicates a number of speculation points which is less than the number of resolved speculation points indicated by the resolution count value, then the eviction determination determines that the oldest renaming entry can be evicted.

18. The data processing apparatus according to claim 17, wherein the eviction control circuitry is configured to perform a further eviction determination for determining whether at least one next oldest renaming entry of the at least some renaming entries can be evicted; and if the total of the numbers of speculation points indicated by the count values for the oldest renaming entry and the at least one next oldest renaming entry is less than the number of resolved speculation points indicated by the resolution count value, then the further eviction determination determines that the at least one next oldest renaming entry can be evicted.

19. The data processing apparatus according to claim 18, wherein the at least one next oldest renaming entry comprises a maximum of N next oldest renaming entries, where N is an integer.

20. The data processing apparatus according to claim 15, comprising power control circuitry configured to place the eviction control circuitry in a power saving state if there are no valid renaming entries in the renaming data store.

21. The data processing apparatus according to claim 1, comprising power control circuitry configured to place the renaming data store in a power saving state if there are no valid renaming entries in the renaming data store.

22. A data processing apparatus for processing a stream of program instructions, comprising first processing means for processing at least some of the program instructions, the first processing means comprising:
a plurality of register means for storing data;
register renaming means for mapping architectural register specifiers identified by the program instructions to physical register specifiers identifying the plurality of register means; and renaming data storage means for storing a plurality of renaming entries, each renaming entry for identifying a register mapping between at least one of the architectural register specifiers and at least one of the physical register specifiers; wherein:
at least some renaming entries have a corresponding count value, the count value indicating a number of speculation points occurring between generation of a previous count value for a previous renaming entry and generation of the count value;
a speculation point comprising a point of program flow of the stream of program instructions following which at least one program instruction is executed speculatively by the data processing apparatus before it is known whether the at least one program instruction should have been executed following the speculation point; and
the count value comprises an N-bit value, where N is an integer and N>1.

23. A data processing method for processing a stream of program instructions using a data processing apparatus comprising first processing circuitry configured to process at least some of the program instructions, the first processing circuitry comprising a plurality of registers for storing data;
the method comprising:
mapping architectural register specifiers identified by the program instructions to physical register specifiers identifying the plurality of registers; and
storing a plurality of renaming entries in a renaming data store, each renaming entry for identifying a register mapping between at least one of the architectural register specifiers and at least one of the physical register specifiers; wherein:
at least some renaming entries have a corresponding count value, the count value indicating a number of speculation points occurring between generation of a previous count value for a previous renaming entry and generation of the count value;
a speculation point comprising a point of program flow of the stream of program instructions following which at least one program instruction is executed speculatively by the data processing apparatus before it is known whether the at least one program instruction should have been executed following the speculation point; and
the count value comprises an N-bit value, where N is an integer and N>1.

24. A data processing apparatus for processing a stream of program instructions, comprising first processing circuitry configured to process at least some of the program instructions, the first processing circuitry comprising:
a plurality of registers for storing data;
register renaming circuitry configured to map architectural register specifiers identified by the program instructions to physical register specifiers identifying the plurality of registers; and
a renaming data store configured to store a plurality of renaming entries, each renaming entry for identifying a register mapping between at least one of the architectural register specifiers and at least one of the physical register specifiers; wherein:
at least some renaming entries have a corresponding count value, the count value indicating a number of speculation points occurring between generation of a previous count value for a previous renaming entry and generation of the count value, the speculation points comprising branch operations or load/store operations; and the count value comprises an N-bit value, where N is an integer and N>1.

* * * * *